United States Patent
Apitz

(10) Patent No.: US 10,209,415 B2
(45) Date of Patent: Feb. 19, 2019

(54) DIELECTRIC MIRROR FOR HIGH-POWER LASER PULSES

(71) Applicant: SCHOTT AG, Mainz (DE)

(72) Inventor: Dirk Apitz, Lausanne (CH)

(73) Assignee: SCHOTT AG, Mainz (DE)

(*) Notice: Subject to any disclaimer, the term of this patent is extended or adjusted under 35 U.S.C. 154(b) by 223 days.

(21) Appl. No.: 14/850,446

(22) Filed: Sep. 10, 2015

(65) Prior Publication Data
US 2016/0070041 A1    Mar. 10, 2016

(30) Foreign Application Priority Data

Sep. 10, 2014 (DE) .......... 10 2014 113 077

(51) Int. Cl.
G02B 1/14 (2015.01)
G02B 5/08 (2006.01)
G02B 5/28 (2006.01)

(52) U.S. Cl.
CPC ............ *G02B 5/285* (2013.01); *G02B 1/14* (2015.01); *G02B 5/0825* (2013.01); *G02B 5/0833* (2013.01)

(58) Field of Classification Search
CPC .. G02B 5/0816; G02B 5/0825; G02B 5/0833; G02B 5/285; G02B 1/14; H01S 3/0057; H01S 3/0071
See application file for complete search history.

(56) References Cited

U.S. PATENT DOCUMENTS

| | | | | |
|---|---|---|---|---|
| 4,147,409 A | * | 4/1979 | Apfel ............ | G02B 5/285 359/584 |
| 2012/0268824 A1 | * | 10/2012 | Goto ............. | G02B 5/0825 359/584 |

OTHER PUBLICATIONS

Yao et al. (Laser-induced damage of high reflectors for Ti:sapphire laser system, Chinese Optics Letters vol. 5, No. 12, pp. 724-726. Dec. 10, 2007).*

(Continued)

*Primary Examiner* — Kimberly N. Kakalec
(74) *Attorney, Agent, or Firm* — Ohlandt, Greeley, Ruggiero & Perle, L.L.P.

(57) ABSTRACT

A dielectric mirror is provided that, on the one hand exhibits a high destruction threshold when being irradiated with ultrashort high-power laser pulses, and on the other hand has a large bandwidth of group delay dispersion. The dielectric mirror includes a layer stack with a sequence of layers having different refractive indices, which act as a reflecting interference filter, wherein the layers are formed of at least three different materials exhibiting different destruction thresholds.

21 Claims, 6 Drawing Sheets

(56) References Cited

OTHER PUBLICATIONS

Gallais et al., Laser-induced damage thresholds of bulk and coating optical materials at 1030 nm, 500 fs (Applied Optics vol. 53, No. 4, pp. A186-A196).*

Bellum et al., "Reactive, Ion-Assisted Deposition of E-Beam Evaporated Ti for High Refractive Index $TiO_2$ Layers and Laser Damage Resistant, Broad Bandwidth, High Reflection Coatings", Applied Optics, vol. 53(4), 8 pages.

Meng et al., "Design and Fabrication of a Novel High Damage Threshold $HfO_2/TiO_2/SiO_2$ Multilayer Laser Mirror", Optoelectronics Letters, vol. 8, No. 3, May 1, 2012, pp. 0190-0192.

Patel et al., "Improvements in the Laser Damage Behavior of $Ta_2O_5/SiO_2$ Interference Coatings by Modification of the Top Layer Design", Laser induced Damage in Optical Materials, 2013 Proc. of SPIE, vol. 8885, pp. 888522-1 to 888522-5.

* cited by examiner

DIELECTRIC MIRROR FOR HIGH-POWER LASER PULSES

CROSS REFERENCE TO RELATED APPLICATIONS

This application claims benefit under 35 U.S.C. § 119(a) of German Patent Application No. 10 2014 113 077.4 filed Sep. 10, 2014, the entire contents of which are incorporated herein by reference.

BACKGROUND OF THE INVENTION

1. Field of the Invention

The invention generally relates to optical systems for lasers. More particularly the invention relates to mirrors exhibiting a high destruction threshold for reflection of high-power laser pulses.

2. Description of Related Art

For high-power laser systems, particularly in research, material processing, or for applications in nuclear fusion, the trend towards increasing power is unbroken. Mention may be made, e.g., of projects ELI, Apollon, and Petawatt.

In order to achieve higher and higher powers up to the petawatt range, pulse energies are increased and pulse durations are shortened. Nowadays, typical pulse durations are in the order of 10 to 200 femtoseconds.

Pulses having such pulse durations cannot be directly amplified, they have to be extended to nanosecond pulse durations, e.g. using grids, amplified in this form in active laser media, and then re-compressed.

Furthermore, these pulses do not have a single wavelength, i.e. they are not monochromatic as it is known from conventional lasers, e.g. continuous-wave lasers. Rather, the pulses comprise an entire wavelength range. This results from Fourier transform between frequencies (wavelengths) and pulse duration, or from Heisenberg's uncertainty principle. Therefore, in order to be able to re-compress a nanosecond pulse after amplification, or to cause interaction of light and matter, all wavelengths of the pulse must be present simultaneously. If the shortest or longest wavelengths components are lacking, the compressed pulse will no longer have a duration of a few femtoseconds, but will be considerably longer. However, media exhibit dispersion, that means the speeds of light of different wavelengths will generally be different. Therefore, the spectrum diverges in time and space and it becomes impossible to re-compress the different spectral components into a femtosecond pulse.

In order to preserve femtosecond pulses as such (so that they do not diverge) to be able to compress longer pulses into femtosecond pulses, or to be able to have femtosecond pulses interact with matter at a particular location, the optical components transmitting these laser pulses should exhibit a lowest possible dispersion over a sufficiently wide range of wavelengths, i.e. the components of the light pulse have to be transmitted at equal speed. For example, the short wavelengths components should not run more slowly through a dispersive medium than the long wavelengths components.

The invention is now based on the object to provide a mirror which on the one hand meets the best possible the above-mentioned requirement of a low group delay dispersion (GDD; simply referred to as dispersion below) over a wide range of wavelengths, and which on the other hand is suitable to reflect pulses of high and highest intensity.

DESCRIPTION OF THE DRAWINGS

The invention and the underlying problem of the invention will now be explained in more detail and with reference to the accompanying drawings, wherein.

DETAILED DESCRIPTION

Figure 1:
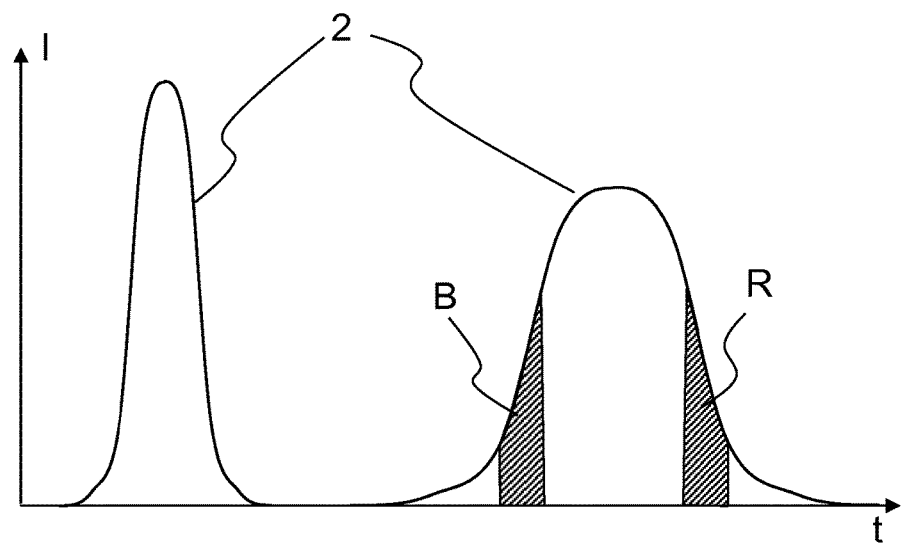
FIG. 1 schematically shows a laser pulse before and after passing through a dispersive medium.

The diagram of FIG. 1 again schematically illustrates the influence of dispersive media on ultra-short broadband laser pulses. Specifically, FIG. 1 shows a laser pulse 2 on a time scale before and after passing through a dispersive medium. Before passing through (shown on the left in the time chart) the laser pulse has a specific duration and intensity. After passing through (shown on the right), the spectral components are separated on the time scale. In the example, the red and blue components are designated "R" and "B", respectively, and are symbolized as shaded areas. In the illustrated example, dispersion of the medium is such that short-wave spectral components pass more slowly through the medium than longer wavelengths spectral components, so that after having passed the blue spectral components temporally lag behind the red components.

Though the integrated pulse energy is essentially conserved, except for absorption and scattering losses, the maximum intensity or power decreases, due to the temporal divergence of laser pulse 2. However, it is especially the pulse power that is generally decisive for high-power laser applications.

For reflecting high-power laser pulses, dielectric mirrors are widely used.

A typical exemplary specification of a femtosecond pulse mirror may, besides size, flatness (reflected wavefront), surface roughness comprise, for example:

Angle of incidence: 45°
Light polarization: S
Range of wavelengths: 700 to 900 nm
Reflectance: >99.5%
Dispersion (GDD): max.±50 fs$^2$
Laser destruction threshold: >0.5 J/cm$^2$ (pulse duration of 20 fs, wavelength of 800 nm).

A very simple dielectric mirror consists of a sequence of layers of high and low refractive indices, having boundary surfaces at which part of the light is reflected and interferes with itself, with layer thicknesses exactly corresponding to the optical path length of a quarter of the design wavelength. Therefore, such a mirror will only have a limited bandwidth, since the condition for interference is met differently for significantly different wavelengths.

In order to create a mirror of greater bandwidth, as it would be beneficial for reflecting femtosecond laser pulses, two measures may be taken: i) either the refractive index difference between the two types of layers, i.e. between the high and low refractive index layers, is increased; or ii) a so-called "chirped" mirror ("chirping" referring to frequency change) is used, in which the layer thicknesses are varied and light of one wavelength is reflected in one region (e.g. in upper layers) and light of a different wavelength in another (vertical) region of the mirror (e.g. in deeper layers).

Figure 2:
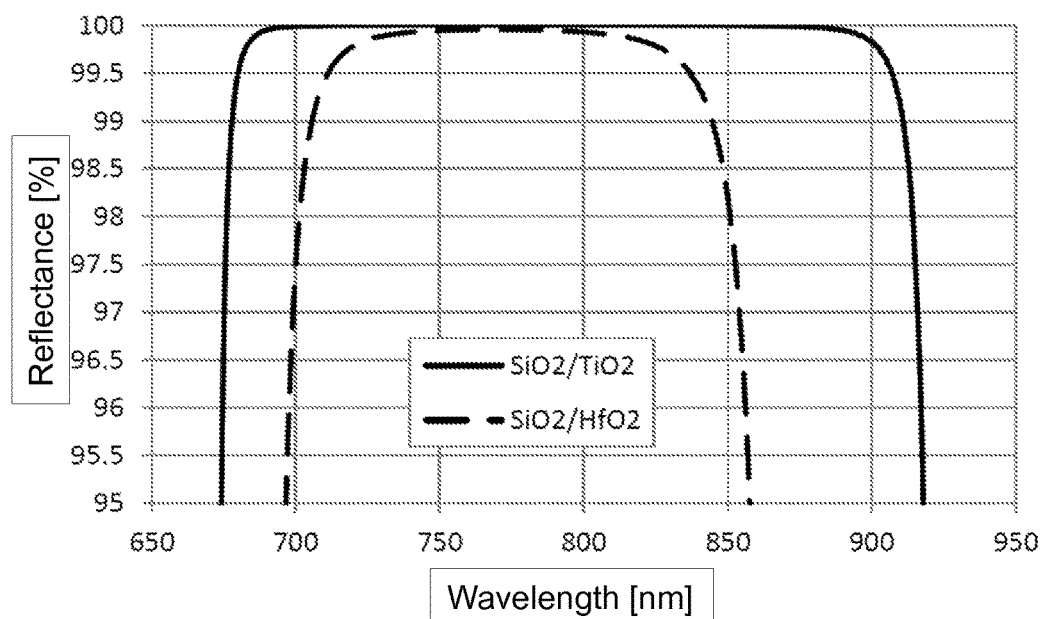
FIG. 2 shows spectral reflectance of two dielectric mirrors with different layer materials.

FIG. 2 illustrates the effect of an increase of the refractive index difference by way of spectral reflectances of two different dielectric mirrors.

The dashed line in FIG. 2 represents the reflectance of an $SiO_2/HfO_2$ layer system, the solid line represents the reflectance of an $SiO_2/TiO_2$ layer system. The refractive index difference between the $TiO_2$ layers and the $SiO_2$ layers is greater than the difference between the $HfO_2$ and $SiO_2$ layers. Therefore, the bandwidth of the $SiO_2/TiO_2$ layer system is significantly greater, as can be seen from FIG. 2. However, $TiO_2$ has a much lower laser destruction threshold as compared to $HfO_2$.

Therefore, both mirror types have decisive drawbacks for use as a high-power ultrashort pulse mirror (referred to as "dilemmas" below). In the layer pack of a dielectric mirror a standing wave is formed, so that at some locations an elevated electric field/elevated light intensity will result. Such peaks constitute the rated break points with respect to the laser destruction threshold. At a boundary surface the destruction threshold will generally be lower than within a layer.

Multiphoton absorption causes energy consumption in the medium and, in case of enough power, destruction thereof. The resistance of a medium strongly depends on its bandgap. In materials having a wider bandgap, the destruction threshold will generally be higher than in materials having a smaller bandgap. Accordingly, $SiO_2$ is more stable than materials having a higher refractive index.

Therefore, for a dielectric mirror that is well suited for high-energy femtosecond pulses (or nanosecond pulses that are to be compressed to femtoseconds) the following should be met:
reflectance should be high;
the bandwidth of reflectivity should be large;
group delay dispersion should be small;
the bandwidth of group delay dispersion should be large;
the peaks of the electric fields should be small;
the materials should have wide bandgaps;
the strong electric fields should be located in the materials having large bandgaps;
the strong electric fields should not be located at boundary surfaces but within layers.

Now, with these conditions some dilemmas are created, as will be exemplified on the high-refractive material $TiO_2$:
$TiO_2$ would be favorable for its high reflectance (high refractive index);
therefore, $TiO_2$ would also be favorable for large bandwidths, see FIG. 2;
$TiO_2$ would be favorable for small dispersion.

A high refractive index, such as in case of $TiO_2$, means that fewer layers are involved in reflection and therefore the path difference (dispersion) for waves of different wavelengths becomes smaller.

However, a drawback of $TiO_2$ is that the bandgap and the destruction threshold are low. $HfO_2$ or $Sc_2O_3$ would be beneficial, since the bandgap and the destruction threshold are larger. However, a drawback of $HfO_2$ or $Sc_2O_3$ is that the refractive index is lower.

Thus, an $SiO_2/TiO_2$ mirror fails to meet the specification for the laser destruction threshold, and an $SiO_2/HfO_2$ mirror fails to meet the specification for the bandwidth of dispersion.

Figure 3:
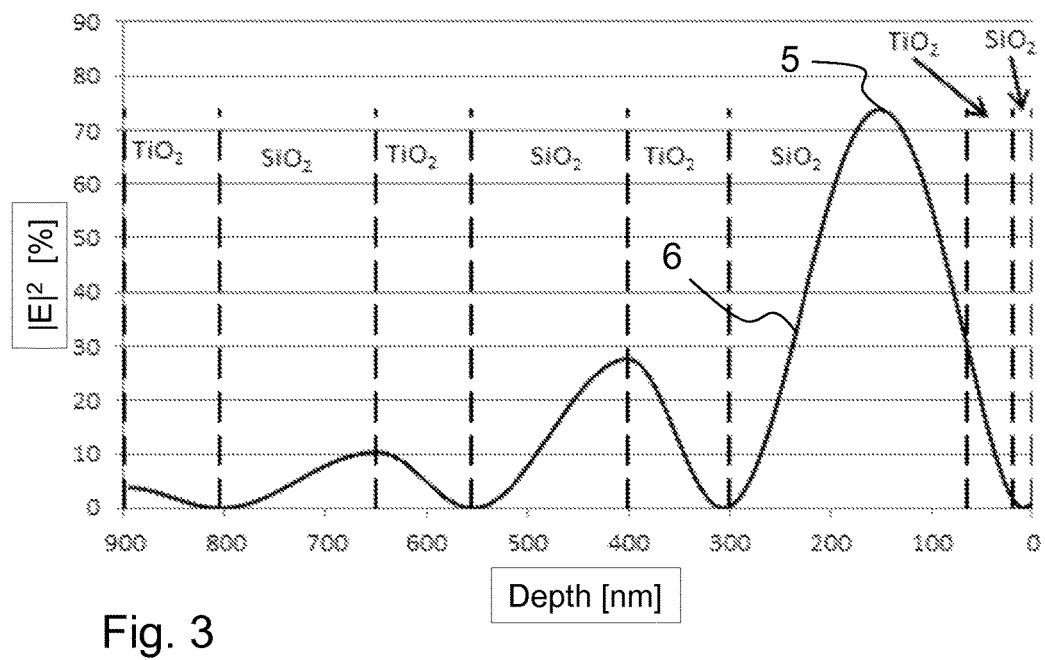
FIGS. 3 and 4 show examples of layer sequences of dielectric mirrors and light intensity (square value of the electric field, normalized to incidence) inside the layer stack of the mirrors.

For illustration purposes, FIG. 3 shows the distribution or profile 6 of the square value of the electric field strength (which is proportional to light intensity) in a dielectric mirror of alternating $SiO_2/TiO_2$ layers. Accordingly, the layers are designated "$SiO_2$" and "$TiO_2$", respectively, and the boundary surfaces between the layers are indicated by dashed lines. In FIG. 3 and in the following figures, profile 6 of field strength is shown for the design wavelength or the wavelength with the maximum intensity of the laser pulse. The profile of the total intensity integrated over the spectrum of the laser pulse does not differ significantly therefrom, so that it is sufficient to consider the design wavelength.

Specifically, FIG. 3 shows the upper eight layers of a multilayered $SiO_2/TiO_2$ mirror. The surface of the mirror is located at a depth of zero, the environment of the mirror to the right of zero. On the left side, at even greater depths than 900 nanometers (i.e. not shown in FIG. 3) further $SiO_2$ and $TiO_2$ layers follow, and finally the substrate on which the layers of the dielectric mirror are deposited.

Here, layer thicknesses are chosen so that the maximum of the electric field is shifted into the second uppermost $SiO_2$ layer. The maximum is about 75% of the intensity of the incident wave and is located at a depth of approximately 150 nm below the surface. The maximum value in the overlying $TiO_2$ layer is at a boundary surface and is approximately 30% (at a depth of about 70 nm). In order to further raise the destruction threshold in this case, the layer thicknesses of the layers could be adjusted so that the intensity maximum is shifted still a little further away from the uppermost $TiO_2$ layer, so that the ratio would rather be 1:3 to 1:6.

From Bellum et al., "Reactive Ion-Assisted Deposition of E-Beam Evaporated Ti for High Refractive Index $TiO_2$ layers and Laser Damage Resistant, Broad Bandwidth, High Reflection Coatings", Applied Optics, Vol. 53(4), A205-A211 it is known to replace high refractive index $TiO_2$ layers of a dielectric mirror, in which the strongest electric fields occur, by $HfO_2$.

In order to obtain a higher destruction threshold than that of the mirror represented in FIG. 3, it is thus possible to replace for instance the upper two or three $TiO_2$ layers by $HfO_2$ layers, but not all $TiO_2$ layers, so that in the layers where the electric field is still quite strong, it is supported by a more resistant material.

Figure 4:
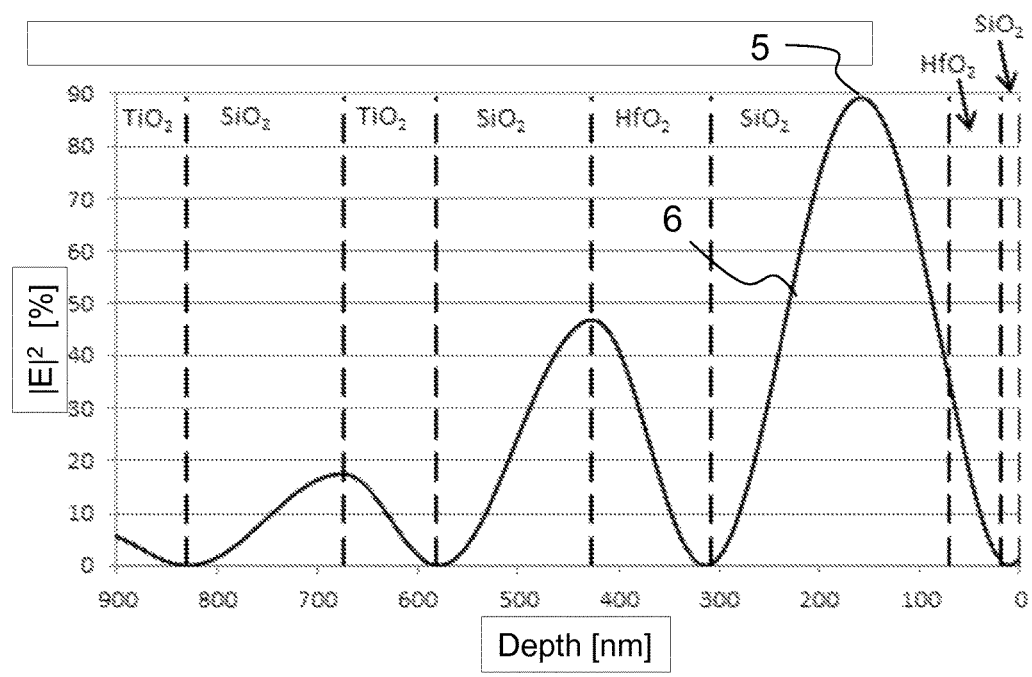

FIG. 4 shows an example of a layer sequence of such a dielectric mirror and the light intensity within the layer stack.

In this example, the maximum values of the electric field are as follows: 90% within the $SiO_2$ layer (at about 150 nm) and 40% in the $HfO_2$ layer at an $SiO_2/HfO_2$ boundary surface (at about 70 nm). Here, the destruction threshold is already higher than in the example of the layer scheme of FIG. 3, since partially $HfO_2$ is used instead of $TiO_2$ and the former has a higher destruction threshold. However, this in turn reduces the bandwidth, or increases dispersion.

A dielectric mirror according to the invention now comprises a layer stack including a sequence of layers having different refractive indices, preferably layers with alternating higher and lower refractive indices, which act as a reflecting interference filter, and the layers are formed from at least three different materials having different destruction thresholds, wherein a first material among the three materials has the lowest refractive index and the second material has a higher destruction threshold than the third material, wherein at least once within the layer stack a layer 14 is formed of the second and the third material, and wherein the composition of this layer 14 (FIG. 5) varies in the direction perpendicular to the boundary surfaces thereof so that at one boundary surface 140 of the layer 14 the second material is present and at the opposite boundary surface 141 of the layer 14 the third material is present, wherein the variation of the composition is chosen so that the light intensity of the standing wave of a laser pulse 2 passing through the layer stack 3 and reflected by the dielectric mirror 1 is higher in the second material than in the third material.

In an easily producible and preferred embodiment of the invention, the layer 14 including the second and third materials comprises two layers or films of which one layer is a layer of the second material and the further layer is a layer of the third material. Preferably, the layers or films of the second and third materials are adjacent to each other so that they have a common boundary surface. In other words, the variation of the composition of layer 14 in this case is a discontinuous change in composition at the transition from the layer of the second material to the layer of the third material. Thus, the layers of the second and third materials are sub-layers of the high refractive index layer 14.

In this case, the sequence of layers is accordingly chosen so that the light intensity of a standing wave of a laser pulse passing through the layer stack and reflected by the dielectric mirror is higher in the layer of the second material than in the layer of the third material.

Destruction threshold refers to the energy per surface area of a laser pulse irradiated onto the material, above which the respective material is destroyed.

Accordingly, the layers of the second and third materials are paired. Both layers together may be regarded as a high refractive index layer 14 in each case, with high refractive and low refractive index layers alternating in the layer stack.

Generally, not only is the destruction threshold of the second material higher than that of the third material. Rather, the second material moreover preferably has a lower refractive index than the third material. As already explained above, this is typically determined by the bandgap of the particular material. A wide bandgap is often accompanied not only by a higher destruction threshold but also by a smaller refractive index.

The distribution of the field strength, or of the light intensity which is proportional to the square value of the field strength, moreover depends on the wavelength to some extent. However, the above-mentioned condition applies in any case in particular to a laser pulse having a mean wavelength that corresponds to the design wavelength of the dielectric mirror. Where necessary, the angle of incidence and the polarization of the laser pulse has to be taken into account, if the dielectric mirror is designed for a particular angle of incidence, such as 45°, and for S-polarization.

Although the example shown in FIG. 4 also uses three different materials, the materials exhibiting the lower destruction thresholds, however, are not adjacent to each other.

But even the examples of FIG. 3 and FIG. 4 have particular characteristics which are also beneficial for a dielectric mirror according to the invention. This will be discussed in more detail below.

Figure 5:
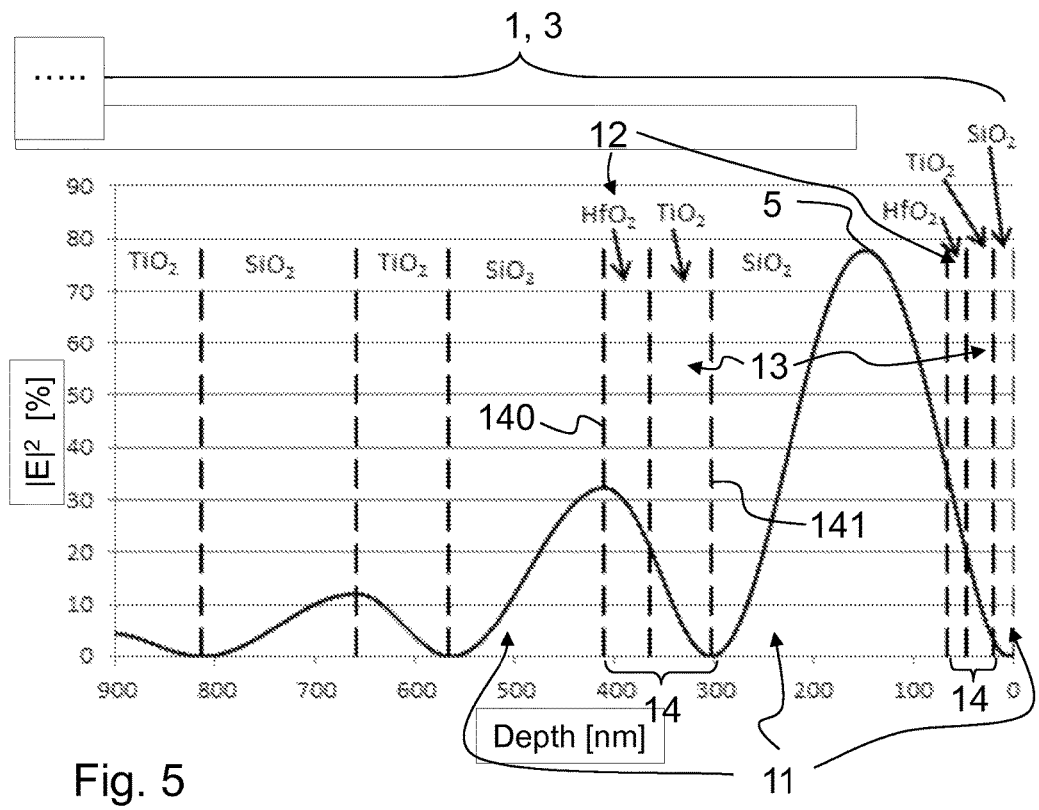
FIG. 5 shows an example of a layer stack of a dielectric mirror according to the invention and the distribution of light intensity of a laser pulse in the layer stack.

FIG. 5 now shows an example of a layer stack 3 of a dielectric mirror 1 according to the invention, as well as the distribution of light intensity of a laser pulse in the layer stack 3. Besides the layer stack 3, the dielectric mirror 1 typically comprises a substrate on which the layer stack 3 is deposited. Since FIG. 5 only shows part of the layer stack 3 with the surface thereof at a depth of 0 nm, the substrate is not shown.

The exemplary embodiment is based on the feature that the portion of the high refractive index layer in which the light intensity exceeds a certain value (e.g. a value of about 20% in the illustrated example) consists of $HfO_2$, the rest of $TiO_2$. Thus, the maximum values of the electric field are: 80% within the $SiO_2$ layer, 35% in the $HfO_2$ layer at an $SiO_2/HfO_2$ boundary surface, and 20% in the $TiO_2$ layer at a $TiO_2/HfO_2$ boundary surface. In this manner, the properties of the two high refractive index materials are optimally exploited.

The invention is of course not limited to the specific example illustrated and the materials used therein. For example, instead of $HfO_2$ another material that has a higher destruction threshold than $TiO_2$ may be used, or mixtures of several of such materials. In this example, the $SiO_2$ layers form the layers 11 of the first material, the $HfO_2$ layers form the layers 12 of the second material, and, finally, the $TiO_2$ layers form the layers 13 of the third material. Successive layers 12, 13 of the second and third materials form a respective layer 14 whose composition varies in the direction perpendicular to the boundary surfaces thereof, so that at one boundary surface 140 of layer 14 the second material is present and at the opposite boundary surface 141 of layer 14 the third material is present. Due to the sequence of layers 12, 13, the variation of the composition of layer 14 is chosen so that the light intensity of the standing wave of a laser pulse 2 passing through the layer stack 3 and reflected by the dielectric mirror 1 will be higher in the second material, in this case especially in layer 12, than in the third material or layer 13 in the present case.

According to one embodiment of the invention it is furthermore generally advantageous if layers of the second and third materials are arranged adjacent to each other at least twice within the layer stack. This is favorable because usually the field strength of a high-power laser pulse decays to a value below the destruction threshold of the third material only at a depth of several layers.

In the example shown in FIG. 5, adjacent layers 12, 13 which form a layer 14 of the second and third materials are provided exactly twice. Specifically, the second and third layers, and the fifth and sixth layers, when counted from the uppermost layer, define such pairs of adjacent layers, wherein the second and fifth layers are formed of the third material and the third and sixth layers are formed of the second material. However, depending on the structure of the layer stack or the requirement in terms of pulse intensity to be reflected, more than two of such sequences or pairs of layers of the second and third materials, or more than two layers 14, may be used.

In order to enable the combination of layers 12, 13 of the second and third materials to effectively raise the destruction threshold and the bandwidth of dispersion of the dielectric mirror, it is furthermore advantageous if the destruction threshold of the material for layers 12 is as high as possible and if the refractive index of the third material for layers 13 is as high as possible. According to one embodiment of the invention it is contemplated that the destruction threshold of the second material is higher by at least a factor of 1.5, preferably at least a factor of 2, than the destruction threshold of the third material. In the example of FIG. 5, the destruction threshold of $HfO_2$ as the second material is higher by about a factor of 2.3 than the destruction threshold of $TiO_2$.

For raising the destruction threshold as described above, it is contemplated to choose the sequence of layers 12, 13 of the second and third materials so that the light intensity of the laser pulse passing through the layer stack, or of the standing wave being formed thereby is higher in the one or more layers 12 of the second material than in the layers 13 of the third material. In the example shown in FIG. 5, therefore, the peaks of light intensity are closer to layers 12, while layer 13 that is adjacent to layer 12 is located on the falling edge towards the surface of the mirror, in a region of lower light intensity.

Materials considered for layers 11, 14 not only include the materials $SiO_2$, $HfO_2$, and $TiO_2$ as used in the example of FIG. 5.

Figure 6:
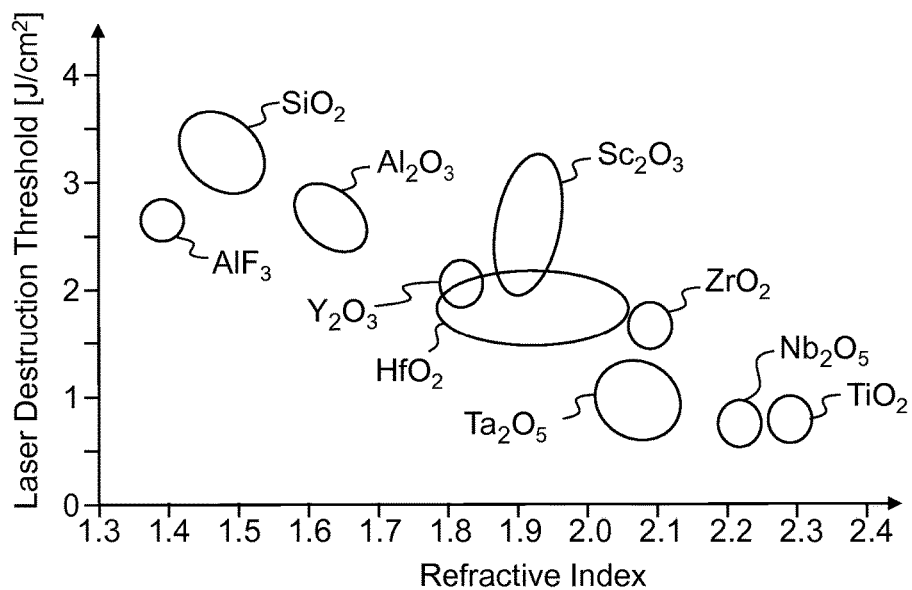
FIGS. 6 and 7 are diagrams of the laser destruction threshold of various materials as a function of refractive index.

FIG. 6 shows the laser destruction thresholds for various oxidic materials as a function of the refractive index. This diagram provides indications for the selection of suitable materials for the layer stack. Among the illustrated materials, $SiO_2$ exhibits the highest destruction threshold and a low refractive index. Therefore, this material is particularly suitable as the first material.

Materials that may likewise be used as the first material having the lowest refractive index, besides $SiO_2$, include e.g. aluminum oxide ($Al_2O_3$), and fluorides such as aluminum fluoride ($AlF_3$), magnesium fluoride (MgF), barium fluoride ($BaF_2$), calcium fluoride ($CaF_2$), yttrium fluoride ($YF_3$), ytterbium fluoride ($YbF_3$), cerium fluoride ($CeF_3$), dysprosium fluoride ($DyF_3$), gadolinium fluoride ($GdF_3$), lanthanum fluoride ($LaF_3$), thorium fluoride ($ThF_4$), and sodium aluminum fluoride ($Na_3AlF_6$). A mixture of the aforementioned materials or doping of these materials with further elements or compounds is also possible.

Besides the titanium oxide ($TiO_2$) mentioned, very high refractive index materials that are suitable as the third material further include niobium oxide ($Nb_2O_5$), zirconium oxide ($ZrO_2$), and tantalum oxide ($Ta_2O_5$), as well as zinc sulfide (ZnS), zinc oxide (ZnO), and zinc selenide (ZnSe), or a mixture containing at least one of these substances. Another suitable combination is, e.g., $SiO_2$ as the first material, $HfO_2$ as the second material, and $Ta_2O_5$ as the third material. Also, these materials may be used in pure form, or as a mixed oxide, and/or with a dopant.

Besides the $HfO_2$ mentioned, especially $Sc_2O_3$ is also suitable as the second material. Tantalum oxide ($Ta_2O_5$) may also be used. Other suitable materials include magnesium oxide (MgO), yttrium oxide ($Y_2O_3$), zirconium oxide ($ZrO_2$), and zinc oxide (ZnO).

A very suited combination is $SiO_2$ as the first, $Ta_2O_5$ as the second, and $TiO_2$ as the third material. As can be seen from the above two examples, there are materials that may be used both as the second and as the third material, depending on the respective other materials. In the two aforementioned examples, $Ta_2O_5$ is once eligible as the second, once as the third material. The same applies to zinc oxide.

$Sc_2O_3$ has almost the same refractive index as $HfO_2$ and an even higher destruction threshold, however it is a very expensive coating material, and moreover its purity is difficult to control. According to one refinement, it is again possible here to use mixtures with $Sc_2O_3$ and/or $HfO_2$ as part of the second material, or a mixed oxide of both substances, or admixtures of other, preferably oxidic materials. In order to obtain second materials with a higher destruction threshold than that of the third material, it is also conceivable to use mixtures or compounds of the first and second materials. For example, the second material may be a mixed oxide of the first and third materials or may contain a mixed oxide. Mixtures of the first material and the materials that are well suited for the second layer are also conceivable (e.g. as a combination of first material: $SiO_2$, second material: $SiO_2$: $HfO_2$, and third material: $TiO_2$). According to one refinement of the invention it is therefore contemplated that the second material includes the first and third materials as a component. It is particularly easy in this case, to prepare the second material as a mixture of the first and third materials. In this case, the first and/or the third material itself may be provided as a mixture of at least two components. For example, if a mixture of $AlF_3$ and $SiO_2$ is chosen for the first material, and a mixture of $TiO_2$ with $ZrO_2$ for the third material, the second material could be prepared as a mixture of the first and third materials and would contain all four components $AlF_3$, $SiO_2$, $TiO_2$, $ZrO_2$ in this case.

Optionally, however, one or more additional components may be added, in addition to the components of the first and third materials.

Figure 7:
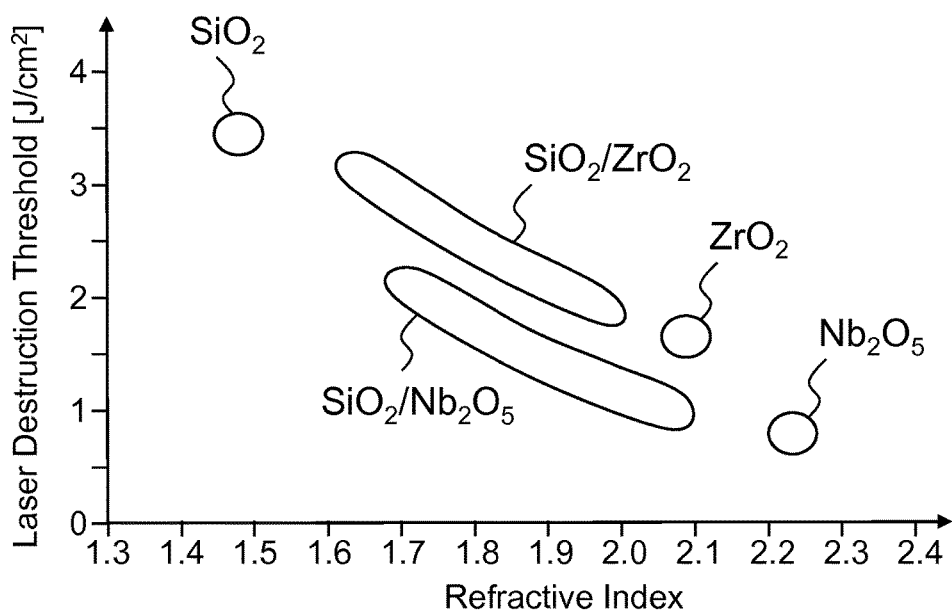

With a mixture of different components, the materials may be tailored to the field strength profile in terms of destruction threshold. The diagram of FIG. 7 illustrates this by way of two mixtures, on the one hand a mixture of $SiO_2$ with $Nb_2O_5$, and as a second example a mixture of $SiO_2$ with $ZrO_2$. Additionally, FIG. 7 shows the destruction thresholds of the starting materials $SiO_2$, $ZrO_2$, and $NbO_2$ with the respective refractive indices, for comparison. The destruction thresholds of mixtures $SiO_2/ZrO_2$ and $SiO_2/Nb_2O_5$ are shown for different mixing ratios. In both mixtures, the refractive index decreases with increasing $SiO_2$ content, while at the same time the laser destruction threshold increases. These profiles now permit to select a mixing ratio depending on the location in the layer stack and the light intensity or field strength at that location.

Generally, it is favorable in terms of bandwidth not to use the three materials throughout the layer stack. Like in the examples shown in FIGS. 3 to 5, the layer stack may further comprise an alternating sequence of layers 11, 13 of the first and third materials. This sequence is in particular arranged below the sequence of layers of the second and third materials, since light intensity is lower there. In the example shown in FIG. 5, the sequence of layers 11, 13 of the first and third materials begins with the seventh layer below the surface, i.e. below the lowermost layer 12 of the second material.

It is furthermore favorable, like in the example shown in FIGS. 3 to 5, to choose the layer thicknesses of layers 11, 12, 13 of the layer stack so that the highest peak 5 and optionally also the second highest peak of light intensity within the layer stack is located in a layer 11 of the first material between the boundary surfaces of this layer. Thus, the point of maximum field strength is placed in the material exhibiting the highest destruction threshold. In the examples shown in FIGS. 3 and 4, this layer, a $SiO_2$ layer, is the third layer of the layer stack, as counted from the uppermost layer which is also a $SiO_2$ layer. The layer pack is covered by a $SiO_2$ layer only by way of example here. Such a mirror may likewise be completed with a high refractive index layer, e.g. a layer 13. A $SiO_2$ layer as finish of the layer stack is particularly favorable for protecting the surface of the layer stack.

The design of the example of FIG. 5 is similar in this respect, however, the second high refractive index layer is divided into two sub-layers in form of an inventive sequence of layers 12, 13 of the second and third materials. Accordingly, the layer 11 of the first material including the peak of light intensity is the fourth uppermost layer in this case.

As can be seen from FIGS. 3 to 5, the maximums and the minimums of field strength in high refractive index layers are generally located at the boundary surfaces thereof. This is favorable to increase the destruction threshold of the mirror on the one hand, and to improve reflectance and bandwidth at the same time.

In order to shift the highest peak 5 of light intensity of a laser pulse into a layer 11 of the first material, the layer thickness chosen for this layer 11 is preferably greater than that of the other layers of the first material 11.

According to yet another refinement of the invention, which is also implemented in the embodiments of FIGS. 3 to 5, the sequence of layers and the layer thicknesses of the layer stack 3 are chosen so that at the surface of the dielectric mirror light intensity is at a minimum. The minimum does not necessarily lie exactly on the surface, as in the illustrated exemplary embodiments. However, it is advantageous if the light intensity at the surface does not exceed 10% of the highest peak of the light intensity. This embodiment ensures that contaminations or defects on the surface exhibiting a low destruction threshold do not result in destruction of the mirror.

For configuring a dielectric mirror according to the invention, the ratios between destruction threshold and magnitude of the electric field may be determined and then the layer thicknesses may be chosen so that the electric fields in the respective materials have a magnitude so that preferably there is no rated breaking point any more. Ideally, the destruction probability should be the same at all maximum values per material and boundary surface. Optionally, it may not be necessary to exactly meet this condition. Rather, it will usually be sufficient if the ratios of destruction threshold of the respective second and third materials and the maximum light intensity in the layers differ by not more than 25%.

This condition is not necessary any more for locations inside the layer stack at which the peaks of light intensity are below the destruction threshold of the third material. In the example shown in FIG. 5, the above condition is applicable for the region of the layer stack which includes the two highest peaks of light intensity. The third highest peak already has a field strength which is below the destruction threshold of the third material, i.e. $TiO_2$ in this case.

Thus, the layer stack is preferably configured so that the aforementioned condition with a deviation of the ratio by not more than 25% applies to the uppermost two sequences of layers 12, 13 of the second and third materials. According to a refinement of this embodiment, this furthermore applies to the layer 11 of the first material in which the highest light intensity occurs.

The portion of the high refractive index layer which is composed of the two layers 12, 13 in each case, in which the electric field exceeds a certain magnitude (about 20% in the example of FIG. 5), consists of $HfO_2$, the rest consists of $TiO_2$. Thus, according to this exemplary embodiment, the maximum values of the electric field amount to 80% within the $SiO_2$ layer 11, to 35% in the $HfO_2$ layer 12 at a $SiO_2/HfO_2$ boundary surface, and to 20% in the $TiO_2$ layer at a $TiO_2/HfO_2$ boundary surface. In this manner, the properties of the two high refractive index materials are optimally exploited.

Figure 8:
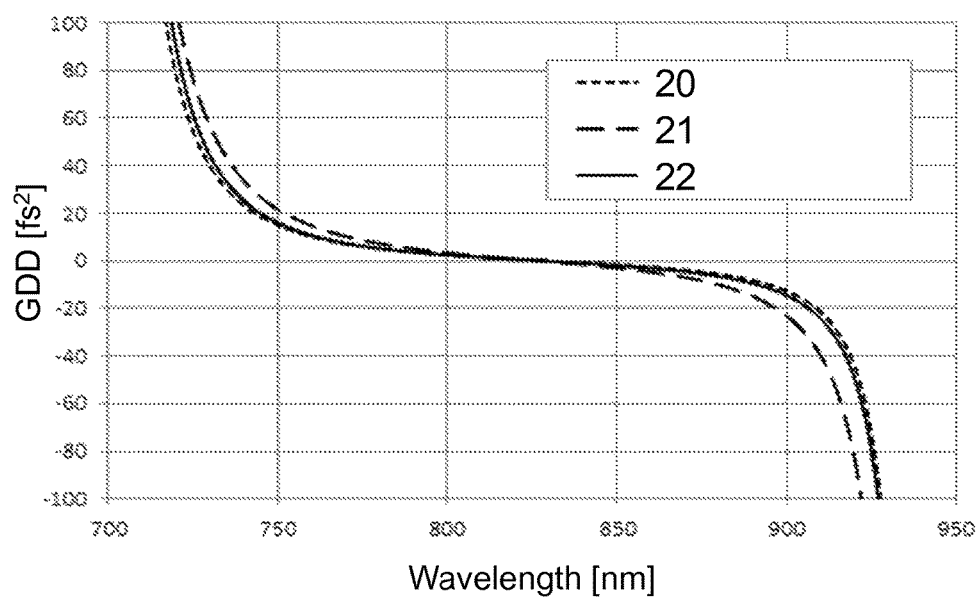
FIG. 8 shows dispersion as a function of wavelength of different layer stacks according to FIGS. 3 to 5.

By way of FIG. 8, the effect of such a configuration of the layers on dispersion will now be explained. FIG. 8 shows group delay dispersion (GDD) as a function of wavelength for three different layer stacks. Curve 20 (short dashed line) represents the dispersion of a $SiO_2/TiO_2$ layer stack as shown in FIG. 3. Curve 21 (long dashed line) is the dispersion of a layer stack according to FIG. 4, in which starting from the example shown in FIG. 3 the uppermost two $TiO_2$ layers are replaced by $HfO_2$ layers. Finally, curve 22 (solid line) is the dispersion of a dielectric mirror according to the invention with a layer sequence according to FIG. 5.

Curve 20 exhibits a very good bandwidth, however, the associated dielectric mirror with a $SiO_2/TiO_2$ layer stack has a low destruction threshold. Curve 21 represents an optimum bandwidth when each of the high refractive index layers consist of one material (high refractive index layers either consist only of $TiO_2$, or, where the electric fields are strong, only of $HfO_2$). Curve 22 represents the dispersion when high refractive index layers are divided into $HfO_2$ and $TiO_2$ layers, as contemplated by the invention. The destruction threshold is approximately the same as with a mirror according to FIG. 4. However, the bandwidth of dispersion according to curve 21 is almost as wide as with curve 20.

In the examples of FIGS. 3 to 5 with the corresponding dispersion curves 20 to 22, the following values for the bandwidth are resulting for a dispersion from −50 to 50 $fs^2$:

|  | Uppermost two high-index layers $HfO_2$, otherwise $TiO_2$ (FIG. 4) | All high-index layers $TiO_2$ (FIG. 3) | Mixed high-index layers of sequence $HfO_2/TiO_2$ (FIG. 5) |
| --- | --- | --- | --- |
| From [nm] | 732.5 | 728.3 | 728.3 |
| to [nm] | 913.5 | 921.4 | 920.1 |
| Bandwidth [nm] | 181 | 194.8 | 191.8 |

Accordingly, in the example shown in FIG. 5, more than 10 nm of bandwidth of dispersion (in the range from −50 to 50 $fs^2$) are gained due to the inventive arrangement of the layers of a dielectric mirror, while the destruction threshold remains the same.

Figure 9:
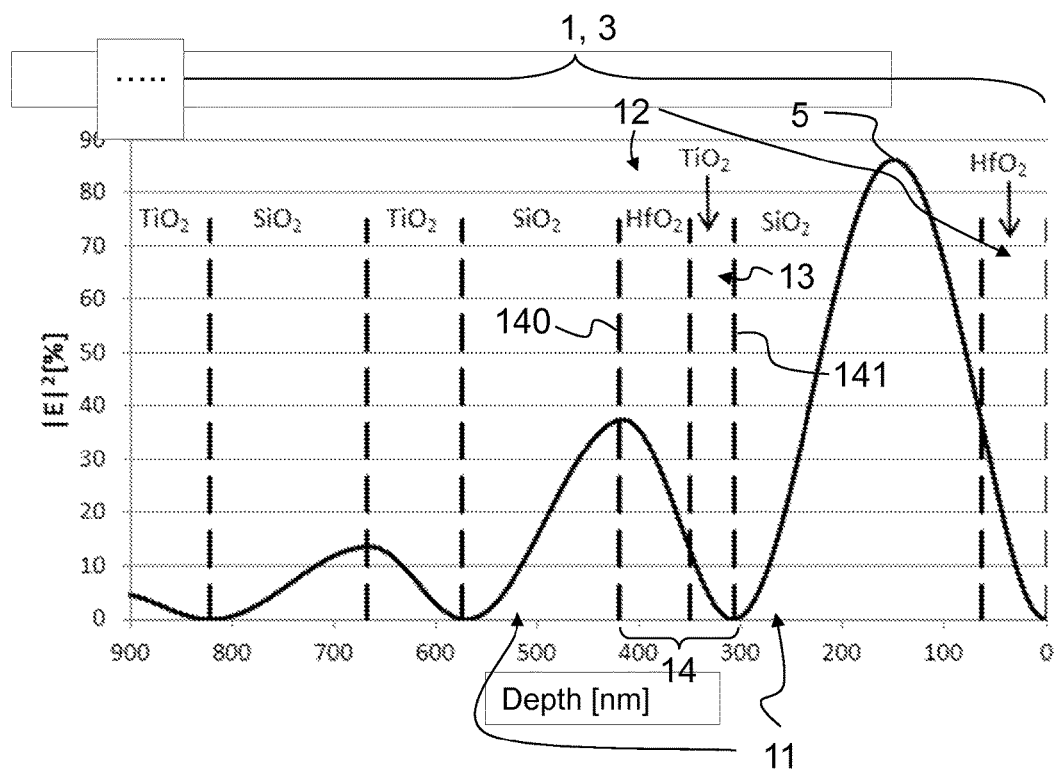
FIG. 9 shows a variation of the embodiment of FIG. 5.

FIG. 9 shows a variation of the embodiment shown in FIG. 5. In this variation, only one high refractive index layer 14 including the second and third materials is provided. Like in the example shown in FIG. 5, this layer 14 is formed of two successive layers 12, 13 of the second and third materials. The uppermost high refractive index layer of the layer stack 3 is not formed by a layer 14 including the second and third materials in this case, but by a single layer of the second material. Although this material (here $HfO_2$, again) has a lower refractive index than the third material (here $TiO_2$), the influence of this layer having a slightly lower refractive index than that of the third material, however, is rather low. But the layer structure is simplified. What generally applies to this embodiment of the invention, without limitation to the specific illustrated exemplary embodiment, is that high and low refractive index layers are alternating in the layer stack, and again, at least once within the layer stack 3 a layer 14 is formed of the second and third materials, so that the composition of layer 14 varies in the direction perpendicular to the boundary surfaces thereof in a manner so that at one boundary surface 140 of layer 14 the second material is present, and at the opposite boundary surface 141 of layer 14 the third material is present, and wherein at least once a layer 12 of the second material is provided adjacent to a layer 11 of the first material, but not adjacent to a layer 13 of the third material. Thus, the latter layer of the second material forms a high refractive index single layer.

Furthermore, the invention is not limited to a replacement of a high refractive index layer by two layers 12, 13 having different laser destruction thresholds. It is also possible to continue the sequence of layers of the second and third materials. In other words, the sequence of layers 12, 13 of the second and third materials may constitute a portion of a proceeding sequence including a layer of a fourth material, optionally a further layer of a fifth material and so on. It is advantageous in this case when the laser destruction threshold successively decreases in the sequence, from the layer of the second material towards layers of further materials, and when the refractive index preferably increases, unless the field strength has a peak within layer 14.

Figure 10:
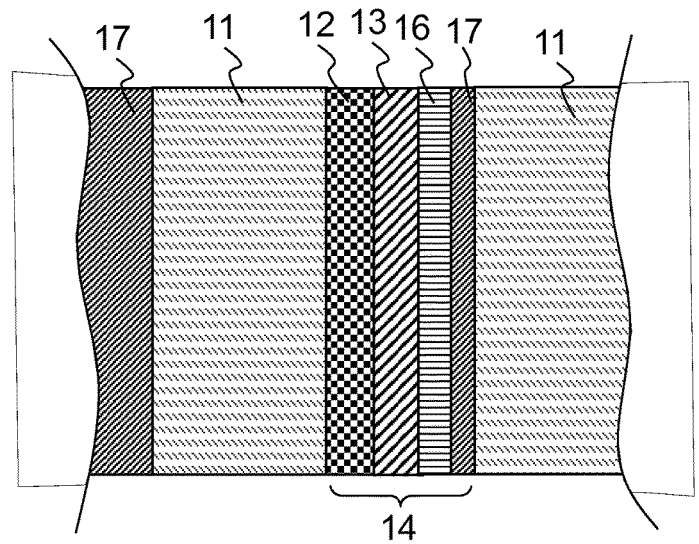
FIG. 10 shows a portion of a layer stack according to a further exemplary embodiment.

FIG. 10 shows an exemplary embodiment of a layer stack 3 in which the high refractive index layer 14 does not only comprise layers 12, 13 of the second and third materials, but additionally a layer 16 of a fourth material and a layer 17 of a fifth material.

Generally, without limitation to the exemplary embodiment, according to one embodiment of the invention it is therefore contemplated that layer 14 including the second and third materials comprises two layers 12, 13, of which one layer 12 is a layer of the second material and the further layer 13 is a layer of the third material, and that the layer 14 of the second and third materials comprises at least one further layer of a further material. Preferably, in this case, the laser destruction thresholds of all materials of layer 14 are different, and the sequence of the layers within layer 14 is preferably chosen so that the laser destruction thresholds of the materials of the layers successively increase along one direction.

Furthermore, the high refractive index layers may be replaced by different numbers of high refractive index materials. For example, the first high refractive index region could comprise a combination of three high refractive index materials, and subsequent replacements could consist of only two high refractive index materials.

Figure 11:
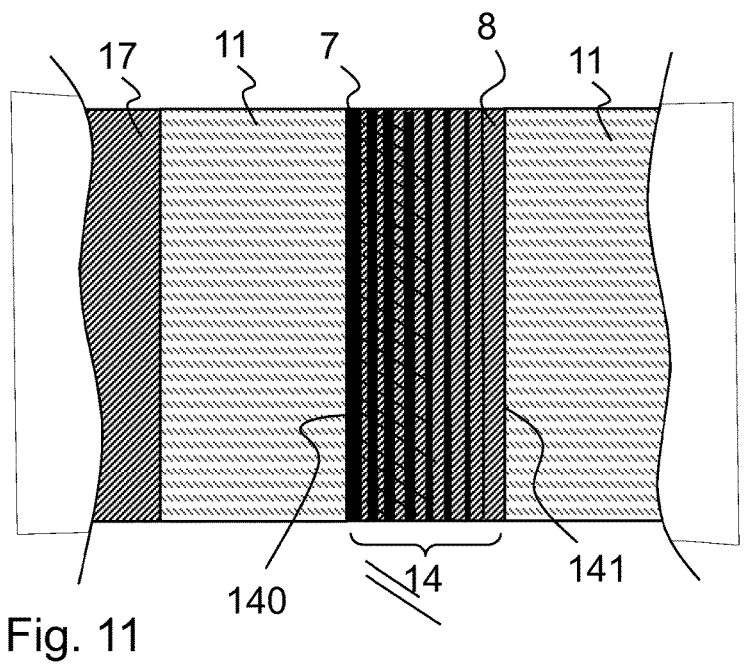
FIG. 11 shows an exemplary embodiment including a gradient layer.

In the embodiments of the invention described so far, layer 14 was formed by a sequence of layers having different laser destruction thresholds. In other words, in these embodiments layer 14 including the second and third materials (and optionally further materials) is a layer sub-stack within layer stack 3 of dielectric mirror 1. On the other hand, however, as becomes clear from FIG. 7, the laser destruction threshold may be continuously varied by combining two materials with different destruction thresholds, as a function of the mixing ratio of these two materials, and in this case typically a continuous variation of the refractive index will result. According to a further embodiment of the invention it is therefore contemplated that within the layer 14 including the second and third materials, the second and third materials are mixed in a manner so that in a direction perpendicular to the boundary surfaces 140, 141 of layer 14 the ratio of the contents of the second and third materials continuously varies, at least along a length thereof. One exemplary embodiment for this is shown in FIG. 11.

Like in the other embodiments, the composition of layer 14 is varied in the direction perpendicular to the boundary surfaces 140, 141 thereof so that at one boundary surface 140 of layer 14 the second material 7 is present, and at the opposite boundary surface 141 of layer 14 the third material 8 is present. In contrast to the embodiments described so far, however, the composition varies continuously in this case. In the example shown in FIG. 11, this is illustrated by the third material 8 symbolized with hatching, whose density decreases in the direction from boundary surface 141 toward boundary surface 140. At boundary surface 141 the third material is present, while at the opposite boundary surface 140 the second material is present. This embodiment may furthermore be combined with the other embodiments with discrete layers 12, 13 described above. For example, between layers 12, 13 of the second and third materials a transition region of continuously varying composition may be provided.

Figure 12:
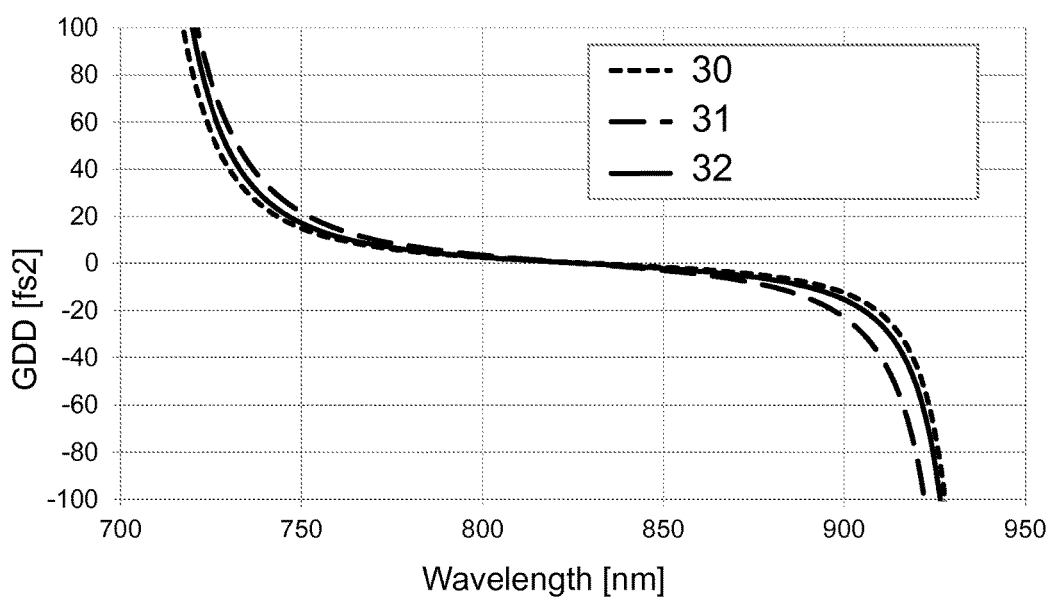
FIG. 12 shows the bandwidth of dispersion as a function of wavelength of different layer stacks for a gradient layer system.

Finally, FIG. 12 shows the bandwidth of dispersion as a function of wavelength of different layer stacks for a gradient layer system. The gradient layer system herein is the gradient layer system shown in FIG. 11. The dispersion as a function of wavelength is very similar to the dispersion shown in FIG. 8.

Curve 30 (short dashed line), curve 31 (long dashed line), and curve 32 (solid line) represent the dispersion of a gradient layer systems with continuously varying composition.

Curve 30 is a $SiO_2/TiO_2$ gradient layer system, curve 31 is a gradient layer system which includes a $HfO_2$ layer, and, finally, curve 32 represents the dispersion of a dielectric mirror according to the invention.

LIST OF REFERENCE NUMERALS

1 Dielectric mirror
2 Laser pulse
3 Layer stack
5 Highest peak of light intensity
6 Profile of square value of the electric field strength
7 Second material
8 Third material
11 Layer of a first material
12 Layer of a second material
13 Layer of a third material
14 Layer including second and third materials
16 Layer of a fourth material
17 Layer of a fifth material
20, 21, 22 Dispersion curves
30, 31, 32 Dispersion curves

What is claimed is:

1. A dielectric mirror, comprising:
   a layer stack with a sequence of layers having different refractive indices, the layer stack acts as a reflecting interference filter,
   wherein the sequence of layers are formed of at least three different materials having different destruction thresholds,
   wherein the at least three different materials includes a first material, a second material, and a third material, the first material having a lowest refractive index and a highest destruction threshold, the destruction threshold of the second material being higher that the destruction threshold of the third material,
   wherein, at least once within the layer stack, the second and third materials form a layer, and wherein the layer has a composition that varies in a direction perpendicular to boundary surfaces of the layer so that at one boundary surface the second material is present and at an opposite boundary surface the third material is present,
   wherein the composition varies so that light intensity of a standing wave of a laser pulse passing through the layer stack and reflected by the dielectric mirror is higher in the second material than in the third material.

2. The dielectric mirror as claimed in claim 1, wherein the layer comprises one layer of the second material and one layer of the third material.

3. The dielectric mirror as claimed in claim 2, wherein the one layer of the second material and the one layer of the third material are adjacent to each other, wherein the sequence of layers is chosen so that the light intensity of the standing wave of a laser pulse passing through the layer stack and reflected by the dielectric mirror is higher in the one layer of the second material than in the one layer of the third material.

4. The dielectric mirror as claimed in claim 2, wherein the layer further comprises a further material, wherein the sequence of layers is chosen so that the laser destruction thresholds successively increase along one direction.

5. The dielectric mirror as claimed in claim 1, wherein the second and third materials are selected so that the destruction threshold of the second material is higher by at least a factor of 1.5 than the destruction threshold of the third material.

6. The dielectric mirror as claimed in claim 1, wherein the second and third materials are selected so that the destruction threshold of the second material is higher by at least a factor of 2 than the destruction threshold of the third material.

7. The dielectric mirror as claimed in claim 1, wherein the first material comprises at least one of substance selected from the group consisting of $SiO_2$, $MgF$, $AlF_3$, $BaF_2$, $CaF_2$, $YF_3$, $YbF_3$, $CeF_3$, $DyF_3$, $GdF_3$, $LaF_3$, $ThF_4$, $Na_3AlF_6$, $Al_2O_3$, and any mixtures thereof.

8. The dielectric mirror as claimed in claim 1, wherein the second material comprises at least one of substance selected from the group consisting of $HfO_2$, $Sc_2O_3$, $Ta_2O_5$, $Y_2O_3$, $ZrO_2$, $MgO$, and $ZnO$.

9. The dielectric mirror as claimed in claim 1, wherein the second material contains the first material and the third material as components.

10. The dielectric mirror as claimed in claim 1, wherein the third material comprises at least one substance selected from the group consisting of $TiO_2$, $Nb_2O_5$, $Ta_2O_5$, $ZrO_2$, and any mixtures thereof.

11. The dielectric mirror as claimed in claim 1, wherein the layer stack further comprises an alternating sequence of layers of the first material and the third material.

12. The dielectric mirror as claimed in claim 1, wherein the layer stack comprises layers with a layer thicknesses designed so that a highest peak of light intensity of a laser pulse within the layer stack is located in a layer of the first material between the boundary surfaces of this layer of the first material.

13. The dielectric mirror as claimed in claim 12, wherein the layer of the first material in which the highest peak of light intensity of the laser pulse is located, has a greater layer thickness than other layers of the first material.

14. The dielectric mirror as claimed in claim 1, wherein the layer stack is configured so that ratios of the destruction thresholds of the second and third materials and the maximum light intensity differ by not more than 25%.

15. The dielectric mirror as claimed in claim 1, wherein the sequence of layers and the layer thicknesses of the layer stack are chosen so that at the surface of the dielectric mirror light intensity is at a minimum.

16. The dielectric mirror as claimed in claim 1, wherein the sequence of layers and the layer thicknesses of the layer stack are chosen so that at the surface of the dielectric mirror light intensity at the surface does not exceed 10% of the highest peak of the light intensity.

17. The dielectric mirror as claimed in claim 1, wherein the layer stack comprises, at least once, a layer of the second material adjacent to a layer of the first material but not adjacent to a layer of the third material.

18. The dielectric mirror as claimed in claim 1, wherein the layer has, within the layer in the direction perpendicular to the boundary surfaces, a ratio of the contents of the second material and the third material that continuously varies, at least along a length thereof.

19. A dielectric mirror, comprising:
a layer stack with a sequence of layers having different refractive indices, the layer stack acts as a reflecting interference filter,
wherein the sequence of layers are formed of at least three different materials having different destruction thresholds,
wherein the at least three different materials includes a first material, a second material, and a third material, the first material having a lowest refractive index and a highest destruction threshold, the destruction threshold of the second material being higher that the destruction threshold of the third material,
wherein, at least once within the layer stack, the second and third materials form a layer, and wherein the layer has a composition that varies in a direction perpendicular to boundary surfaces of the layer so that at one boundary surface the second material is present and at an opposite boundary surface the third material is present,
wherein the composition varies so that light intensity of a standing wave of a laser pulse passing through the layer stack and reflected by the dielectric mirror is higher in the second material than in the third material, and
wherein the layer stack is configured so that ratios of the destruction thresholds of the second and third materials and the maximum light intensity differ by not more than 25%.

20. A dielectric mirror, comprising:
a layer stack with a sequence of layers having different refractive indices, the layer stack acts as a reflecting interference filter,
wherein the sequence of layers are formed of at least three different materials having different destruction thresholds,
wherein the at least three different materials includes a first material, a second material, and a third material, the first material having a lowest refractive index and a highest destruction threshold,
wherein, at least once within the layer stack, the second and third materials form a layer, and wherein the layer has a composition that varies in a direction perpendicular to boundary surfaces of the layer so that at one boundary surface the second material is present and at an opposite boundary surface the third material is present,
wherein the layer stack is configured with layer thicknesses so that a highest peak of light intensity within the stack is between boundary surfaces of a layer of the first material.

21. The dielectric mirror as claimed in claim 20, wherein the layer stack is configured with layer thicknesses so that a second highest peak of light intensity within the stack is between boundary surfaces of the layer of the first material.

* * * * *